United States Patent [19]
Seitz

[11] Patent Number: 4,623,391
[45] Date of Patent: Nov. 18, 1986

[54] COLOR DEVELOPERS FOR PRESSURE-SENSITIVE OR HEAT-SENSITIVE RECORDING PAPERS

[75] Inventor: Michael E. A. Seitz, Dayton, Ohio

[73] Assignee: The Standard Register Company, Dayton, Ohio

[21] Appl. No.: 721,879

[22] Filed: Apr. 10, 1985

Related U.S. Application Data

[62] Division of Ser. No. 544,422, Oct. 2, 1983, Pat. No. 4,531,139.

[51] Int. Cl.$^4$ .............................................. C09D 11/00

[52] U.S. Cl. ...................................... 106/21; 346/216; 427/150; 427/151

[58] Field of Search .......................... 106/21; 346/216; 427/150, 151

[56] References Cited

U.S. PATENT DOCUMENTS

| | | | |
|---|---|---|---|
| 2,948,753 | 8/1960 | Kranz | 564/80 |
| 3,924,027 | 12/1975 | Saito et al. | 427/147 |
| 3,934,070 | 1/1976 | Kimura et al. | 346/210 |
| 3,958,815 | 5/1976 | Poot et al. | 346/201 |
| 4,173,684 | 11/1979 | Stolfo | 346/210 |
| 4,291,901 | 9/1981 | Petitpierre | 346/216 |
| 4,482,905 | 11/1984 | Kaneko et al. | 346/216 |
| 4,531,139 | 7/1985 | Seitz | 346/216 |

FOREIGN PATENT DOCUMENTS 111905 6/1979 Japan .

*Primary Examiner*—Amelia B. Yarbrough
*Attorney, Agent, or Firm*—Jacox & Meckstroth

[57] ABSTRACT

Color developers for use in pressure-sensitive or heat-sensitive recording papers comprise N-monosubstituted sulfonamides which contain at least one electron-withdrawing group within five atoms of the amido group of the sulfonamide. The N-monosubstituted sulfonamide may be in the form of an N-substituted, N'-mono or di-substituted sulfamide, or a polyfunctional molecule containing such an N-monosubstituted sulfonamide as the functional or impeding group thereof. The maximum color developing potential is realized when these compounds are used in conjunction with a source of metal or metal compound.

5 Claims, No Drawings

COLOR DEVELOPERS FOR PRESSURE-SENSITIVE OR HEAT-SENSITIVE RECORDING PAPERS

This application is a division of application Ser. No. 544,422, filed Oct. 21, 1983, now U.S. Pat. No. 4,531,139.

FIELD OF THE INVENTION

The present invention relates to novel color developers for use in carbonless copy papers (CCP) and thermal imaging papers (TP) which will produce a stable intense mark when placed in contact with colorless dye precursors. The present invention also relates to record material sheets bearing a coating which contains such novel color developers.

BACKGROUND OF THE INVENTION

Pressure-sensitive or heat-sensitive recording papers rely on two components to form color. One component is a colorless or slightly colored dyestuff or color precursor. The other component is an acidic material or color developer which is capable of forming a color by reaction with the dyestuff or color precursor. Marking of the recording papers is effected by pressure or heat which transfers one reactant to the other.

Pressure-sensitive recording material consists, for example, of at least one pair of sheets which contain at least one dyestuff or color precursor, dissolved in an organic solvent, and a color developer. The dyestuff or color precursor effects a colored marking at those points where it comes into contact with the color developer.

In order to prevent the color precursors contained in the pressure-sensitive recording material from becoming active prematurely, they are usually separated from the developer. This can advantageously be accomplished by incorporating the color precursors in foam-like, sponge-like, or honeycomb-like structures. Preferably, the color formers are enclosed in microcapsules which usually can be ruptured by pressure.

In a common method of manufacture of pressure-sensitive recording papers, better known as carbonless copy papers, a layer of pressure-rupturable microcapsules containing a solution of colorless or slightly colored dyestuff or color precursor, is normally coated on the backside of the front sheet of paper of a carbonless copy paper set. This coated backside is known as the CB coating. In order to develop an image or copy, the CB coating must be mated with a paper containing a coating of suitable color developer on its front. This coated front color developer coating is called the CF coating. Marking of the pressure-sensitive recording papers is effecting by rupturing the capsules in the CB coating by means of pressure to cause the dyestuff precursor solution to be exuded onto the front of the mated sheet below it. The colorless or slightly colored dyestuff, or dyestuff precursor, then reacts with the color developer in the areas at which the pressure was applied, thereby affecting the colored marking. Such mechanism or the producing technique of pressure-sensitive recording papers is well known.

Various developers for use in thermoreactive recording material are also well known. Thermoreactive recording material usually contains at least one carrier, one color precursor, one solid developer and, optionally, also a binder. The thermoreactive recording systems comprise, for example, heat-sensitive recording and copying materials and papers. These systems are used, for example, for recording information, e.g., in electronic computers, teleprinters or telewriters, or in recording and measuring instruments. The image (mark) formation can also be effected manually with a heated pen. Laser beams can also be used to produce heat-induced marks. The thermoreactive recording material can be so composed that the color precursor is dispersed or dissolved in one binder layer and the developer is dissolved or dispersed in the binder in a second layer. Another possibility consists in dispersing both the color precursor and the developer in one layer. By means of heat, the binder is softened at specific areas and the color precursor comes into contact with the developer at those points where heat is applied and the desired color develops at once.

Color precursors are well known to those experienced in the field and any such color former may be used in conjunction with the present invention, e.g., those belonging to the classes of the phthalides, fluoranes, spiropyranes, azomethines, triarylmethane-leuco dyes, of the substituted phenoxazines or phenothiazines, and of the chromeno or chromane color formers. Examples of such suitable color precursors are: crystal violet lactone, 3,3-(bisamino-phenyl)-phthalides, 3,3-(bisubstituted indolyl)-phthalides, 3-(aminophenyl)-3-indolylphthalides, 6-diaalkylamino-2-n-octylaminofluoranes, 6-dialkylamino-2-arylaminofluoranes, 6-dialkylamino-3-methyl-2-arylaminofluoranes, 6-dialkylamino-2- or 3-lower alkylfluoranes, 6-dialkylamino-2-dibenzylaminofluoranes, 6-dialkylamino-2-dibenzylaminofluoranes, 6-diethylamino-1,3-dimethylfluoranes, the lactonexanthenes, the leucoauramines, the 2-(omega substituted vinylene)-3,3-disubstituted-3-1-1-indoles, 1,3,3-trialkylindolinospirans, bis-(aminophenyl)-furyl-, phenyl- or carbazolylmethanes, or benzoyl-leucomethylene blue.

Known color developers for use in such pressure-sensitive or heat-sensitive recording papers have included:

(1) novolac phenolic resins made by acid catalyzed condensation of phenol, recorcinol, pyrogallol, cresols, xylenols, or alkyl phenols such as p-tertiary butyl phenol, with aldehydes such as formaldehyde, acetaldehyde, benzaldehyde, and butyraldehyde;

(2) Metal salts of aromatic carboxylic acids with an OH group at the ortho position, such as zinc salts of salicylic acid, 3,5-di-tert-butyl salicylic acid, octyl salicylic acid, and 1-hydroxy-2-naphthoic acid, and (3) acid-treated clays such as kaolinites and attapulgites.

The search has continued for other developers having high developing power, rapid developing speed, good light resistance and time stability. Examples of some colored developers which have been developed in the past which are somewhat related to those of the present invention are disclosed in U.S. Pat. No. 4,291,901 to Petitpierre and Japanese patent disclosure No. 1979-111905.

SUMMARY OF THE INVENTION

Accordingly, it is an object of the present invention to provide a novel color developer for use in pressure-sensitive or heat-sensitive recording papers.

It is another object of the present invention to provide an improved record sheet coated with such a novel color developer.

A further object of the present invention to provide such a color developer with excellent color developing properties.

These and other objects of the present invention are obtained by means of the novel color developers of the present invention which are, in part, N-monosubstituted sulfonamides which contain at least one electron-withdrawing group. The simple sulfonamides and n-monoalkyl sulfonamides ($RSO_2NH_2$ and $RSO_2NHR'$ respectively) have acidities that are too weak for these materials to be very useful as primary color developers. They are useful as film modifiers and/or secondary color developers. However, the addition of an electron-withdrawing group not more than five (5) atoms from the NH group on the sulfonamide increases its acidity (via the inductive effect), and makes the sulfonamides suitable for use as primary color developers. Where applicable, the $pK_a$ ($-\log K_a$, where $K_a$ is the acid dissociation constant) of the sulfonylamide ($-SO_2-NH-$) group should be in the range of 9.5 to 2.5, and preferably in the range of 8 to 4. Suitable electron-withdrawing groups are those substituents which possess positive Hammett or Taft constants. The novel color developers can also be N-monosubstituted, N'-mono or di-substituted sulfamides [$R'''(R_o'')-N-SO_2NHR_o'$]. Again for the reasons stated above, an electron-withdrawing group must be no more than 5 atoms from the NH group.

The maximum color developing potential is realized when these N-monosubstituted sulfonamides or N,N'-substituted sulfamides are used in conjunction with some source of metal or metal compound. Specifically, the sulfonamines or sulfamides may be (1) mixed with or dissolved in an organic metal salt such as zinc oleate, zinc octoate, and zinc acetate,
(2) precipitated onto a metal oxide hydroxide, or carbonate such as zinc oxide, zinc hydroxide, or zinc carbonate,
(3) co-precipitated from water with soluble metal salts like zinc chloride, zinc ammonium chloride, or zinc sulfate, or
(4) chemically modified by a metal so as to incorporate the metal into the sulfonamide or sulfamide molecules.

The latter will take the form of organic acid salt formation by reacting either an extra

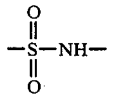

group or a COOX group in the sulfonamide or sulfamide with a basic metal oxide or carbonate. The salt may also be formed by reaction of alkali salt of the sulfonamide (or sulfamide) with a soluble acidic metal salt such as zinc sulfate. The above examples are restricted to zinc for the sake of being concise. Other metals such as aluminum, barium, bismuth, calcium, cerium, cesium, lithium, magnesium, tin, and titanium may be used in place of zinc.

DETAILED DESCRIPTION OF PREFERRED EMBODIMENTS

The present invention comprehends all compounds which include a sulfonylamide ($-SO_2NH-$) group and also include an electron-withdrawing atom or moiety within five atoms of the NH group. However, the compound must be free of any basic group, for example, epoxy or $NH_2$. Any additional NH groups within the compound must be no more than one carbon away from an $SO_2$ group, or to a $C{=}O$, $C{\equiv}N$, or $NO_2$ group. The present invention further excludes such compounds in which the electron-withdrawing group is a carboxy phenyl group connected through the nitrogen atom of the sulfonylamide group or in which the sole electron-withdrawing group is a carboxyphenyl group. Also excluded are compounds having a CHOH group directly connected to a nitrogen atom.

Particularly preferred sulfonylamide compounds in accordance with the present invention have electron withdrawing groups on both sides of the sulfonylamide grouping.

Subject to the above conditions, the electron withdrawing group can be any of the following: $-NO_2$, $-SO_2R$, $-CN$, $-SO_2Ar$, $-COOH$, $-SO_2NH_2$, $-SO_2NHR$, $-SO_2NR_2$, $-F$, $-Cl$, $-Br$, $-I$, $-OAr$, $-COOR$, $-COOAr$, $-OR$, $-OH$, $-SR$, $-SH$, $-COR$, $-COAr$, $-C{\equiv}CR$, $-Ar$, $-CH{=}CR_2$, wherein R is an alkyl group of up to 18 carbon atoms, preferably 3-8 carbon atoms, and Ar is any aryl group, preferably phenyl or naphthyl. The R and Ar groups may be optionally substituted as long as the above conditions are met.

Particularly useful compounds for use as color developers in accordance with the present invention are N-monosubstituted sulfonamides represented by formula

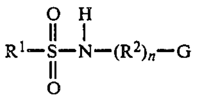
(I)

where $R^1$ and $R^2$ are alkyl (branched or linear), preferably with no more than 18 carbon atoms and most preferably with 3-8 carbon atoms, aryl, preferably phenyl or naphthyl, or a combination of both, each of which may be substituted or unsubstituted, said substituents, if any, being any group other than a basic group, such as epoxy or $NH_2$, and if $-NH-$ it must be no more than one carbon atom away from a $SO_2$, $C{=}O$, $C{\equiv}N$ or $NO_2$ group;

G is an electron withdrawing group as defined above and is not more than five atoms away from the $-NH-$ group, with the proviso that G is not $-OH$ or $-SH$ when n is 1 and with the further proviso that $-(R^2)_n-G$ is not

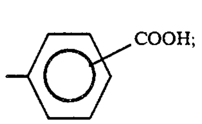

and n is 0 or 1.

Other sulfonamides useful in the practice of the present invention are those in accordance with formula

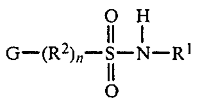
(II)

wherein n, $R^1$, $R^2$ and G are as defined above with the proviso that $R^1$ is not

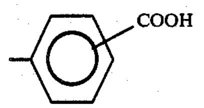

and with the further proviso that G is not COOH in formula II when all of the following three conditions apply: $R^2$ is aryl, n is 1, and $R^1$ does not comprehend or include an electron-withdrawing group (as defined above for G) within 5 atoms of the NH group.

Analogous to the sulfonamides above, the N-mono-substituted, N'-mono or di-substituted sulfamide color developers, which are also particularly useful in accordance with the present invention, are represented by formula III below:

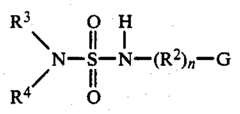

(III)

where $R^2$, G and n are as defined above and $R^3$ and $R^4$ are as defined above for $R^1$ and $R^2$ although one of $R^3$ and $R^4$ may be H; furthermore, when one of $R^3$ and $R^4$ is H, the other may be an electron withdrawing group as defined above for G.

The usefulness of the N-monosubstituted sulfonamides as color developers is enhanced further by placing electron-withdrawing groups on both sides of the sulfamoyl group.

Preferred such compounds useful in the practice of the present invention are represented by formula IV:

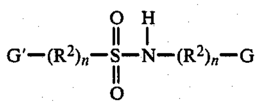

(IV)

wherein n, $R^2$ and G are as defined above and G' is an electron withdrawing group as defined above with respect to G.

While the substituents with respect to formulae I–IV and the remainder of the generic formula as discussed above may include any functional group not specifically proscribed, it particularly may include additional —$SO_2NH$—, alkyl, aryl and electron withdrawing (as defined above for G) groups, and may, in fact, be a polymer containing repeating units of any of the above.

Examples of compounds within formula (I) are as follows:

N—(phenyl sulfonyl)-p-toluenesulfonamide

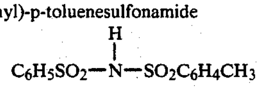

N—phenyl-benzene sulfonamide

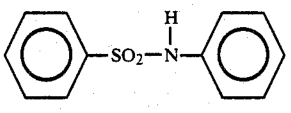

n-butyl-N—(phenylsulfonyl)-p-aminobenzoate

-continued

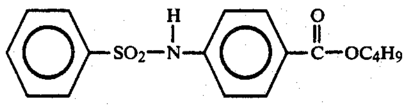

N—α-(p-toluenesulfonyl)-DL—phenylalanine

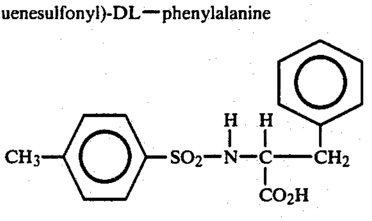

N—(carboxymethyl)-p-toluenesulfonamide

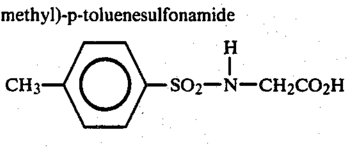

N—[o-(p-toluenesulfonamido)phenyl]-p-toluenesulfonamide

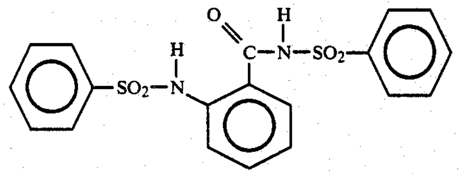

With respect to examples of compounds of formula (II), it should be noted that in Japanese patent disclosure 1979-111905, comparative compound example 3, i.e. N-(octadecyl)-o-carboxybenzene sulfonamide, is taught as being a poor developer, particularly in comparison with the anthranilic developers disclosed by the Japanese patent. It has surprisingly been discovered, however, that the addition of another electron withdrawing group, this time on the nitrogen side of the sulfonamide, further increases the color developing property and such compounds thus become preferred compounds of the present invention. Examples of compounds in formula (II) including the above described preferred compounds are as follows:

n-butyl-N—(o-carboxyphenylsulfonyl)-p-amino-benzoate

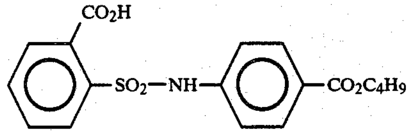

N—(o-carboxyphenylsulfonyl)-4-aminobenzophenone

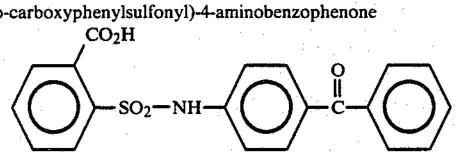

N—(o-carboxyphenylsulfonyl)4-aminobenzenesulfonamide

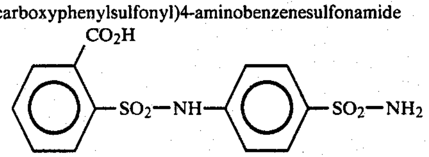

N—(4-n-butylphenyl)-o-carboxybenzenesulfonamide

-continued

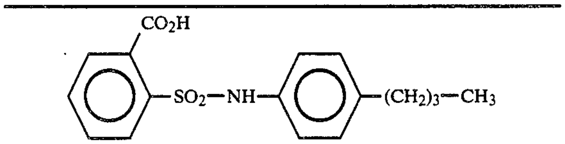

N—(4-octylphenyl)-o-carboxybenzenesulfonamide

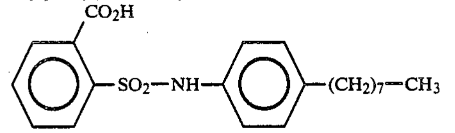

N—(4-dodecylphenyl)-o-carboxybenzenesulfonamide

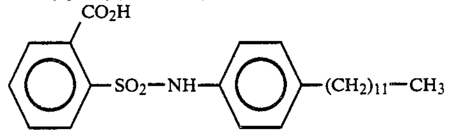

N—(2,4-diethylphenyl)-o-carboxybenzenesulfonamide

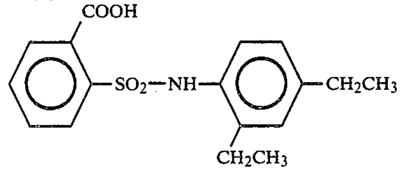

With respect to all of the above acids, the preferred form is that of the metal salt, particularly an alkaline earth metal salt, and more particularly a zinc salt.

Examples of formula (III) are:

N—(dimethylsulfamoyl)-p-toluenesulfonamide

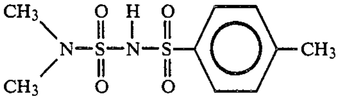

N—phenyl-N'—isopropylsulfamide

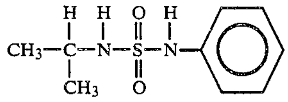

N—benzoyl-N'—isopropylsulfamide

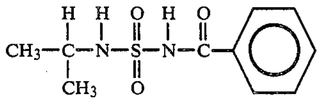

N—phenyl-N',N'—dimethylsulfamide

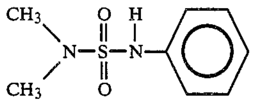

N—(dimethylsulfamoyl)-α-aminophenylacetic acid

-continued

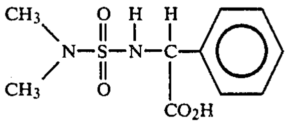

N—(o-(N',N'—dimethylsulfamoylamido)-phenyl)-dimethylsulfamide

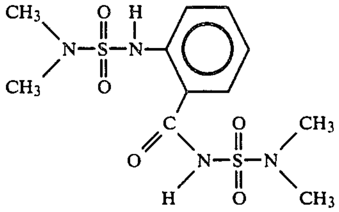

With respect to compounds under formula (IV), note the compounds already set forth hereinabove as examples under formula (II).

In addition to the above formulas, an infinite number of polyfunctional molecules can be synthesized. However, the functional group or repeating unit in each of these molecules would still be a N-monosubstituted sulfonamide or sulfamide as depicted in formulas (I) through (IV). For instance, the polysulfonamides prepared from aromatic disulfonyl chlorides and aromatic diamines, such as polycondensate of benzene disulfonyl chloride and p,p'-diaminodiphenylmethane (also called methylene dianiline):

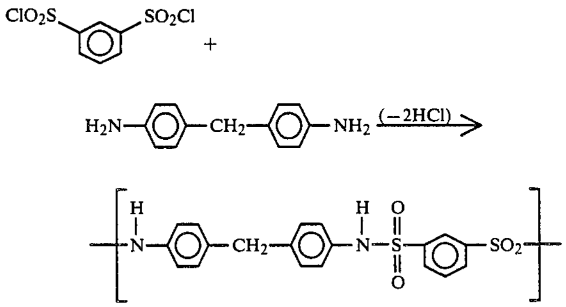

With respect to the above reaction scheme, the molecular weight can be controlled by carboxymethoxybenzene sulfonyl chloride as a reaction terminator. Another such a polycondensate is the product of a mild, selective hydrolysis of the methyl esters of the reaction product of two moles carboxymethoxy benzene sulfonyl chloride (CBC from Sherwin-Williams Co.) with trimethylene glycol di-p-aminobenzoate (Polacure 740M from Polaroid Corporation), trimethylene bis(N-o-carboxylphenylsulfonyl)-p-aminobenzoate

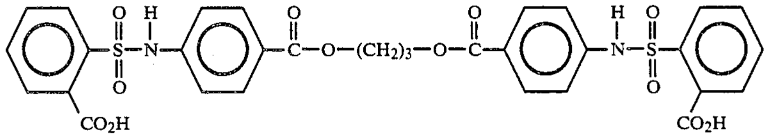

An even superior compound is the complex of mixed zinc salt that results from reacting the above compound with more basic zinc salts.

The synthesis of all of the above compounds is quite straightforward. They are prepared by reacting the appropriate sulfonyl (or sulfamoyl) chloride with an amine, amide, or sulfonamide. The reaction (for amines) can be performed in an aqueous solution or suspension by using the Schotten-Baumann technique with sodium carbonate as base (see Scheifele and D. F. Detar, *Org. Syn. Coll.* Vol. 4, 34 (1963)). Alternatively, the reaction (for amides and sulfonamides) may be performed in an inert solvent such as acetonitrile (see E. Muller, ed. *Methoden der Organischer Chemie* (Houben-Weyl), vol. 9, 4th ed., Georg Thieme Verlag, Stuttgart, West Germany, pp. 398–404, 605–648 (1955)).

The following compounds are further examples of the present invention:

N—toluenesulfonyl-α-aminophenylacetic acid
(N—toluenesulfonyl-α-phenylglycine)

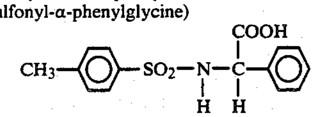

N—phenylsulfonyl-α-aminophenylacetic acid

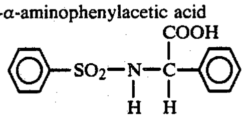

N—(m-carboxybenzoyl)-p-toluenesulfonamide

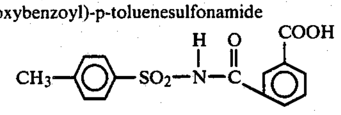

N—(m-carboxybenzoyl)-benzenesulfonamide
N—(m-carboxybenzoyl)-N',N'—dimethylsulfamide
N—(o-carboxybenzoyl)-p-toluenesulfonamide

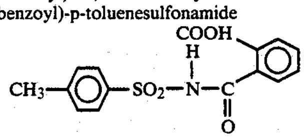

N—(o-carboxybenzoyl)-benzenesulfonamide
N—(o-carboxybenzoyl)-N',N'—dimethylsulfamide
N—(m-nitrobenzoyl)-p-toluenesulfonamide

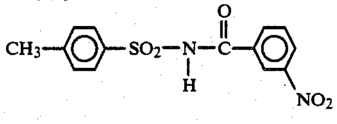

N—(m-nitrobenzoyl)-benzenesulfonamide
N—(m-nitrobenzoyl)-N',N'—dimethylsulfamide
N—(p-nitrobenzoyl)-p-toluenesulfonamide

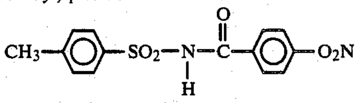

N—(p-nitrobenzoyl)-benzenesulfonamide
N—(p-nitrobenzoyl)-N',N'—dimethylsulfamide
N—(phenylsulfonyl)-p-toluenesulfonamide

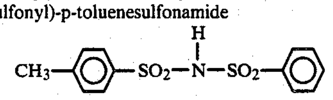

N—(phenylsulfonyl)-benzenesulfonamide
4,4'-oxybis[N—(phenylsulfonyl)-benzenesulfonamide]

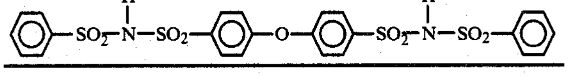

It should be noted that the most preferred electron withdrawing groups (G and G') are $—SO_2R$; —COOH; —OR; —COOR; —COR; $—NO_2$; —CN; and the halides. The most preferred set of electron-withdrawing groups are $—SO_2R$; —COOH; —OR; —COOR; and —COR.

The following preparative example shows a method of synthesis of one of the compounds used in the present invention. It should be understood that all of the other compounds can be made by analogous synthesis or in manners which are already known to the prior art, or could be derived from methods known to the prior art without undue experimentation. Throughout all of the present examples and claims all percentages are by weight unless otherwise indicated.

PREPARATIVE EXAMPLE

Preparation of N-(p-n-butylphenyl)-o-carboxybenzene sulfonamide (1)

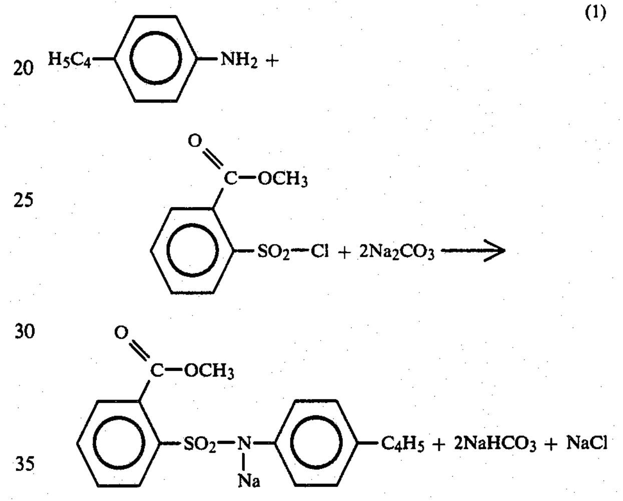

The first stage of the reaction (as shown in reaction scheme I hereinabove) is carried out by dissolving 254.4 g (2.4 moles) of sodium carbonate (granular, 99+%, ACS reagent grade) in 1.5 liters of water. The solution is heated to 50° C., and at 50°–60° C., 149.2 g or 157 ml (1 mole) of p-n-butylaniline (97% purity) and 281.6 g of carbomethoxybenzene sulfonyl chloride (commercially available under the name CBC) are added alternately in five portions each. The dual additions of the five portions of each reactant are timed at approximately 5 minute intervals. That is, 31.6 ml of butylaniline is added and followed directly by the addition of 56.32 g of CBC. After 5 minutes have passed, the next portions are added again in immediate succession, i.e., 31.6 ml butylaniline followed by 56.32 g CBC. This continues until all five portions of each reactant have been added. Sodium hydroxide may be added in case carbon dioxide is evolved which occurs if an insufficient amount of sodium carbonate is present.

After all of the reactants have been added, the temperature is raised to 80° C. and held for 25 minutes, and the mixture then cooled to room temperature.

(II)

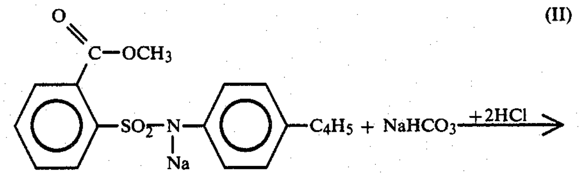

-continued

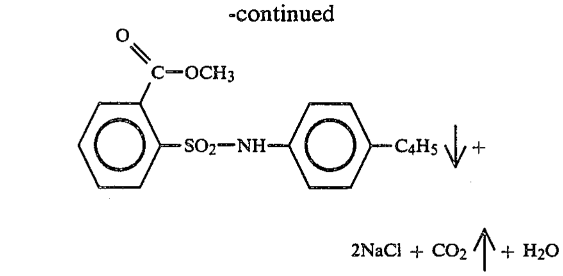

Reaction scheme II is carried out by slowing adding the cooled reaction mixture into a 4 liter beaker containing 250 ml water and 300 ml of hydrochloric acid (37%), and equipped with an efficient stirrer, taking care that the mixture does not foam over. The dispersion is chilled in a refrigerator over night. The crude N-(p-n-butylphenyl)-o-carbomethoxy benzene sulfonamide settles on the bottom of the beaker as a brownish, viscous mass. The water layer is poured off and replaced by a solution of 80 g sodium hydroxide in 1.5 liter of water. The resulting solution is heated for 2 hours at 85° C. to hydrolize the methyl ester (reaction scheme III).

(III)

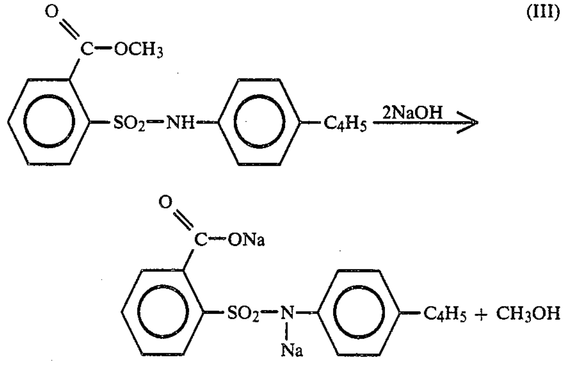

The solution is filtered at room temperature to remove a very small amount of black precipitate. The solution is again poured into a 4 liter beaker containing 250 ml water and 300 ml hydrochloric acid (37%). (Reaction scheme IV)

(IV)

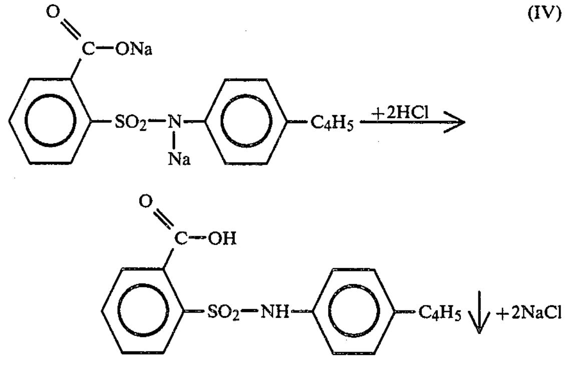

The product is isolated by filtration using a Buchner funnel, and is washed with water on the filter. The filtrate is allowed to air dry, and then pulverized to a light brown to beige powder. The yield is approximately 90% (based on butylaniline) and purity is approximately 96%. The procedure could be simplified by consolidating reactions I and III, as well as II and IV, thereby avoiding the difficult to handle methyl ester. The procedure is an adaptation of the related preparation of p-toluenesulfonyl anthranilic acid as submitted by H. J. Scheifele, Jr. and D. F. DeTar in *Organic Synthesis, Collective,* volume 4, p. 37 (1963).

The following examples show methods of formulating coatings containing the developers of the present invention for application to pressure-sensitive recording papers. The coatings are formulated to be porous. This permeability is usually obtained through the use of fillers, such as aluminum oxide, zinc oxide, silicon dioxide, clay or organic thixotropes. The binders are predominantly saturated aliphatic or aromatic compounds. The number of extraneous, organic, polar groups in the final, dried coating are kept to an absolute minimum. Acid groups and their metal salts are the notable exceptions. The color developer should be the predominant, nonfugitive, polar material in the CF coating. For example, in the moisture set ink below, the full color developing potential appears only after the solvents (diethylene glycol, triacetin, and absorbed water) leave the film during the setting process. It will be understood that other fillers, binders and solvents can be used to complete the compositions of the present invention, all as are conventional in this art and well known.

EXAMPLE 1

An Aqueous Coating 5.4% trimethylene bis(N-(o-carboxylphenylsulfonyl)-p-aminobenzoate) was added to 3.7% ammonium hydroxide in 26% aqueous solution and 50% water, and mixed until completely dissolved. Thereupon 10% Pencoate RBB 725 (an oxidized starch from Penick and Ford, Division of Pacific Resins and Chemicals, Inc.), 1% zinc ammonium chloride and 30% zinc oxide were added and mixed thoroughly in a high speed mixer or mill.

As an alternative to the above approach of incorporation, the sulfonamide (or its zinc salt) may be pulverized in a ball mill, and then simply mixed with the rest of the components. If zinc salt is used, then the ZnO may be replaced by hydrated alumina.

EXAMPLE 2

A Letterpress Coating—Moisture Set Ink

A kettle was charged with 24.7% diethylene glycol and 24.7% triacetin (glyceryl triacetate). 5% Lacros 294 (an acid modified rosin resin from Crosby Chemicals, Inc.) was added and heated to 95° C. for 30 minutes or until dissolved. Thereupon, 30.0% n-butyl-N-(o-carboxyphenylsulfonyl)-p-aminobenzoate was added and, upon dissolution, 4.0% Kadox 15 (zinc oxide-chemical grade from New Jersey Zinc Co.) was added. The temperature was maintained at 100°-105° C. for one hour, although a longer heating period may be required for more inert grades of ZnO. 5.0% of diethylene glycol monostearate, 5.0% zinc octoate and 0.1% benzotriazole were added in quick succession and cooled to 65° C. Then 1.5% (or less, if preferred) Crayvalac SF (organic thixotrope from Cra-Vac Industries, Inc.) was added and dispersed thoroughly with a high speed mixer, and drained through a mesh filter. The active ingredient is the zinc salt n-butyl-N-(o-carboxyphenylsulfonyl)-p-aminobenzoate.

EXAMPLE 3

A Flexo-Gravure Coating

10% trimethylene bis(N-o-carboxyphenylsulfonyl)-p-aminobenzoate) and 16.0% Lacros 294 were dissolved in 62% ethyl alcohol. To this solution, 10.0% zinc octoate (18% Zn) were added while stirring. Into this clear solution were dispersed 2.0% Alumina Oxide C (fumed aluminum oxide from Degussa Corp.) or 2.0% fumed silica (trade name "Aerosil" 200 or R 972 from Degussa Corp.).

EXAMPLE 4

Transfer Litho (Letterpress) Ink

A mixture of 37.0% mineral seal oil and 30.3% zinc octoate (96% pure with remainder as mineral seal oil) is heated to 100° C. and then 10.2% zinc resinate (Poly Tac 100 from Reichhold Chemicals Inc.) is added. After a clear solution is obtained, 18% N-(p-n-butylphenyl)-o-carboxybenzene sulfonamide prepared by the method of the preparative example above, is added. 2.2% zinc oxide (Kadox 15 from New Jersey Zinc Co.) is dispersed into the solution and the solution is heated for 1½ hours at 100°-117° C. The mixture is cooled down to 80° C. and 1.5% Cravalac SF is dispersed with a high speed mixer. If the texture of the ink is too coarse, the ink is passed through a 3-roll mill. The color developer is present in the form of a fine dispersion.

EXAMPLES 5 AND 6

Following the same general procedure as set forth in example 4, other transfer litho (letterpress) inks can be made using different sulfonamides. Two examples of same showing the relative amounts of components are set forth hereinbelow in Table I:

TABLE 1

| Components | Examples 5 wt. % | Examples 6 wt. % |
|---|---|---|
| Mineral seal oil | 33.7 | 32.4 |
| Zinc octoate | 28.0 | 25.4 |
| Zinc resinate | 6.7 | 5.9 |
| N—(4-n-octylphenyl-o-carboxybenzenesulfonamide | 26.4 | 0 |
| N—(4-n-dodecylphenyl)-o-carboxybenzenesulfonamide | 0 | 32.4 |
| Zinc oxide | 2.7 | 2.9 |
| Cravalac SF | 1.5 | 1.1 |

The color developers in 5 and 6 are present in solution.

Table 2 shows the color developing power of the products of examples 4, 5 and 6, as compared to a commercial product:

TABLE 2

| | Coating Wt. of Color Developer ($g/m^2$) | Coating Wt. of Ink | NCR - Blue (CB) BNL No.[2] | NCR - Blue (CB) Color | NCR - Black (CB) BNL No. | NCR - Black (CB) Color | Test CB[1] - Black BNL No. | Test CB[1] - Black Color |
|---|---|---|---|---|---|---|---|---|
| Example 4-CF | 0.11 | 0.6 $g/m^2$ | 69 ± 2 | Violet | 50 ± 1 | Reddish-Black | 39 ± 1 | Reddish-Black |
| Example 5-CF | 0.21 | 0.8 $g/m^2$ | 59 ± 1 | Blue (Reddish) | 49 ± 2 | Reddish-Black | 33 ± 3 | Black |
| Example 6-CF | 0.24 | 0.75 $g/m^2$ | 63 ± 2 | Blue | 47 ± 2 | Reddish- | 33 ± 2 | Black |
| Commercial NCR-CF | 0.8-1.2 | Aqueous Coating | 43 ± 3 | Blue | 42 ± 3 | Black | 31 ± 1 | Greenish-Black |

[1]An approximately 5 $g/m^2$ coating of a 40% by weight capsule slurry containing a solution of Ciba-Geigy Pergascript I-BR Dye in di-isopropyl biphenyl (7% dye on oil by weight).
[2]Reflectance Scale 0-100; the lower the number, the darker the image

EXAMPLE 7

Comparative Example

The following is a comparison proving the superiority of the compounds of the present invention to those of comparative compound 3 in Japanese patent application 1979-111905.

1(a) 10 g zinc salt of N-(4-dodecylphenyl)-o-carboxybenzenesulfonamide was dissolved in 50 ml of ethyl acetate, as described in "Application 1" of JP 1979-111905. This solution was applied to 11 lb. paper stock (41 $g/m^2$) at a coating weight of 0.2 $g/m^2$. The resulting CF1 sheet was mated with commercial NCR CB paper (15#), and the 2-ply formset was fed through a mini-calander set at 30 psi pressure to produce 37 kg/cm. After one hour, the image intensity was measured on a BNL-2 Opacimeter from Technidyne Corporation as reflectance percent of the imaged area relative to the sheet.

1(b) A CF2 was made and tested as above except the coating solution contained 10 g N-(4-dodecylphenyl)-o-carboxybenzenesulfonamide and 10 g zinc octoate in 50 ml ethyl acetate.

2(a) The above procedure 1(a) was repeated using the zinc salt of N-(octadecyl)-o-carboxybenzenesulfonamide as the color developer to produce CF3.

2(b) A CF4 sheet was prepared as in 1(b) except N-(octadecyl)-o-carbonylbenzenesulfonamide was used as the color developer.

Results: A low reflectance value, R, represents an intense image.

TABLE 3

| CF Sheet | Reflectance % | Comments |
|---|---|---|
| Zn[N—4-dodecylphenyl)-o-carboxybenzenesulfonamide]$_2$ CF1 | 58 | The preferred color developers of the present invention |
| N—(4-dodecylphenyl)-o-carboxybenzenesulfonamide CF2 | 54 | |
| Zn[N—octadecyl)-o-carboxybenzenesulfonamide]$_2$ CF3* | 96* | The comparative compound 3 in JP 1979-111905 |
| N-octadecyl)-o-carboxybenzenesulfonamide CF4 | 87 | |
| Plain 11 lb (41 g/m) Paper stock | 100 | |
| Commercial NCR CF paper 15# | 46 | Phenolic resin used as color developer. Coat weight ≈ |

TABLE 3-continued

| CF Sheet | Reflectance % | Comments |
|---|---|---|
| | | 0.8-1.2 $g/m^2$ |

*The coating solution of CF3 was not homogeneous. As a result, CF2 and CF4 is better comparison The preferred color developer is significantly better than the comparative compound 3.

It will be obvious to those skilled in the art that various changes may be made without departing from the scope of the invention and the invention is not to be considered limited to what is described in the specification.

The invention having thus been described, the following is claimed:

1. In a color developer composition for coating onto sheet material to make pressure-sensitive or heat-sensitive recording material, containing a color developer compound, a solvent, and other additives to permit coating, the improvement wherein said color developer compound is a compound including a sulfonylamide ($—SO_2NH—$) group and also including an electron-withdrawing atom or moiety within five atoms of the nitrogen atom of said sulfonylamide group, said compound being free of any basic group, with any additional NH groups being no more than one carbon atom away from an $SO_2$, C═O, C≡N or $NO_2$ group, with the proviso that the electron withdrawing group is not a carboxyphenyl group connected through the nitrogen atom of the sulfonylamide group, with the further proviso that the sole electron-withdrawing group is not a carboxyphenyl group and with the further proviso that said compound does not include a —CHOH— group directly connected to a nitrogen atom.

2. A color developer composition in accordance with claim 1, wherein, subject to the provisos thereof said electron-withdrawing group is selected from the group consisting $—NO_2$, $—SO_2R$, —CN, $—SO_2Ar$, —COOH, $—SO_2NH_2$, $—SO_2NHR$, $—SO_2NR_2$, —F, —Cl, —Br, —I, —OAr, —COOR, —COOAr, —OR, —OH, —SR, —SH, —COR, —COAr, —C≡CR, —Ar, $—CH═CR_2$, wherein R is an optionally substituted group and Ar is an optionally substituted aryl group.

3. A color developer composition in accordance with claim 1, wherein said compound has electron-withdrawing groups on both sides of the sulfonylamide grouping.

4. A color developer composition in accordance with claim 1, wherein, subject to the provisos thereof, said compound is:

an N-monosubstituted sulfonamide of the formula

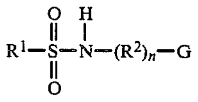

(I)

in which $R^1$ and $R^2$ are alkyl, aryl or a combination of alkyl and aryl, each being substituted or unsubstituted, said substituents, if any, being any group other than a basic group and, if —NH—; no more than one carbon atom away from a $SO_2$, C═O, C≡N or $NO_2$ group, G is an electron-withdrawing group selected from the group consisting of $—NO_2$, $—SO_2R$, —CN, $—SO_2Ar$, —COOH, $—SO_2NH_2$, $—SO_2NHR$, $—SO_2NR_2$, —F, —Cl, —Br, —I, —OAr, —COOR, —COOAr, —OR, —OH, —SR, —SH, —COR, —COAr, —C≡CR, —Ar, $—CH═CR_2$, wherein R is an optionally substituted alkyl group and Ar is an optionally substituted aryl group, G being not more than five atoms away from the amide group of the sulfonylamide grouping, with the proviso that G is not —OH or —SH when n is 1 and with the further proviso that $—(R^2)_n—G$ is not

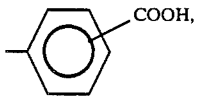

and n is 0 or 1;

a sulfonamide of the formula

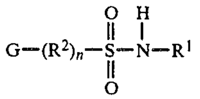

(II)

in which, $R^1$, $R^2$ and G are as defined above, with the proviso that $R^1$ is not

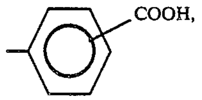

and with the further proviso that G is not COOH when all of the following three conditions apply; $R^2$ is aryl; n is 1, and $R^1$ does not comprehend or include an electron-withdrawing group within five atoms of the amide group of the sulfonylamide grouping;

an N-mono-substituted, N'-mono or di-substituted sulfamide of the formula

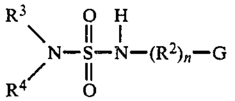

(III)

in which $R^2$, G and n are as defined above, and $R^3$ and $R^4$ are as defined for $R^1$ and $R^2$ or one of $R^3$ and $R^4$ is H, and further in which, when one of $R^3$ and $R^4$ is H, the other may be an electron-withdrawing group as defined above for G;

an N-monosubstituted sulfonamide having electron withdrawing groups on both sides of the sulfamoyl group, of the formula

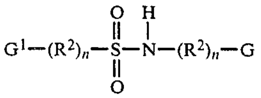

(IV)

in which n, $R^2$ and G are as defined above and $G^1$ is an electron-withdrawing group as defined above with respect to G; or a polyfunctional molecule in which each functional group or the repeating unit is an N-monosubstituted sulfonamide or sulfamide depicted in formulas (I) through (IV).

5. A color developer composition in accordance with claim 1, wherein said compound is selected from the group consisting of:

N-(phenylsulfonyl)-p-toluenesulfonamide
N-phenyl-benzene sulfonamide
$C_{3-8}$ alkyl-N-(phenylsulfonyl)-p-aminobenzoate
N-α-(p-toluenesulfonyl)-DL-phenylalanine
N-(carboxymethyl)-p-toluenesulfonamide
N-[o-(p-toluenesulfonamido)phenyl]-p-toluenesulfonamide
$C_{3-8}$ alkyl-N-(o-carboxyphenylsulfonyl)-p-aminobenzoate
N-(o-carboxyphenylsulfonyl)-4-aminobenzophenone
N-(o-carboxyphenylsulfonyl)4-aminobenzenesulfonamide N-(4-$C_{1-18}$ alkylphenyl)-o-carboxybenzenesulfonamide
N-2(2,4-di$C_{3-8}$ alkylphenyl)-o-carboxybenzenesulfonamide
N-(di$C_{1-8}$ alkylsulfamoyl)-p-toluenesulfonamide
N-phenyl-N'-$C_{1-8}$ alkylsulfamide
N-benzoyl-N'-$C_{1-8}$ alkylsulfamide
N-phenyl-N',N'-di$C_{1-8}$ alkylsulfamide
N-di$C_{1-8}$ alkylsulfamoyl)-α-aminophenylacetic acid
N-o-(N',N'-di$C_{1-3}$alkylsulfamoylamido)-phenyl-di$C_{1-8}$alkylsulfamide
trimethylene bis(N-o-carboxylphenylsulfonyl)-p-aminobenzoate
N-toluenesulfonyl-α-aminophenylacetic acid
N-phenylsulfonyl-α-aminophenylacetic acid
N-(m-carboxybenzoyl)-p-toluenesulfonamide
N-(m-carboxybenzoyl)-benzenesulfonamide
N-(m-carboxybenzoyl)-N',N'-dimethylsulfamide
N-(o-carboxybenzoyl)-p-toluenesulfonamide
N-(o-carboxybenzoyl)-benzenesulfonamide
N-(o-carboxybenzoyl)-N',N'-dimethylsulfamide
N-(m-nitrobenzoyl)-p-toluene sulfonamide.

* * * * *